(12) United States Patent
Begin

(10) Patent No.: US 10,362,775 B1
(45) Date of Patent: Jul. 30, 2019

(54) FLEXIBLE GRIP ROD HOLDER

(71) Applicant: Jason Begin, Roswell, GA (US)

(72) Inventor: Jason Begin, Roswell, GA (US)

(*) Notice: Subject to any disclaimer, the term of this patent is extended or adjusted under 35 U.S.C. 154(b) by 268 days.

(21) Appl. No.: 15/430,248

(22) Filed: Feb. 10, 2017

Related U.S. Application Data

(60) Provisional application No. 62/319,841, filed on Apr. 8, 2016.

(51) Int. Cl.
*A01K 97/10* (2006.01)
*A01K 99/00* (2006.01)

(52) U.S. Cl.
CPC .......... *A01K 97/10* (2013.01); *A01K 99/00* (2013.01)

(58) Field of Classification Search
CPC ...................................... A01K 97/10
USPC ........................................ 43/21.2
See application file for complete search history.

(56) References Cited

U.S. PATENT DOCUMENTS

| | | | | |
|---|---|---|---|---|
| 1,435,085 A * | 11/1922 | Schumacher | .......... | A01K 97/10 43/21.2 |
| 2,604,287 A * | 7/1952 | Robbins | .......... | A01K 97/10 248/540 |
| 3,047,262 A * | 7/1962 | Ripich | .......... | A01K 97/10 248/538 |
| 3,792,829 A * | 2/1974 | Fickett | .......... | A01K 97/10 248/229.15 |
| 4,807,384 A * | 2/1989 | Roberts, Sr. | .......... | A01K 97/125 43/17 |
| 4,827,654 A * | 5/1989 | Roberts | .......... | A01K 97/10 248/514 |
| 4,916,847 A * | 4/1990 | Rusgo | .......... | A01K 91/065 43/19.2 |
| 5,142,809 A * | 9/1992 | O'Brien | .......... | A01K 97/10 248/514 |
| 5,231,785 A * | 8/1993 | Roberts | .......... | A01K 97/10 248/538 |
| 6,302,367 B1 * | 10/2001 | Ratza | .......... | A01K 97/10 248/515 |
| 6,357,166 B1 * | 3/2002 | Malmanger | .......... | A01K 97/10 43/21.2 |
| 6,561,471 B1 * | 5/2003 | Hawie | .......... | A01K 97/10 211/60.1 |
| 7,131,232 B1 * | 11/2006 | Fecht | .......... | A01K 97/10 43/21.2 |
| 7,686,276 B1 * | 3/2010 | McCauley | .......... | A01K 97/10 224/922 |
| 8,024,886 B2 * | 9/2011 | Sutherland | .......... | A01K 97/10 248/514 |
| D820,382 S * | 6/2018 | Pratt | .......... | D22/147 |
| 2008/0155881 A1 * | 7/2008 | Carnevali | .......... | A01K 97/10 43/21.2 |

(Continued)

*Primary Examiner* — Christopher P Ellis
(74) *Attorney, Agent, or Firm* — Alexander Legal LLC

(57) ABSTRACT

A fishing rod holder is presented that can include: a base that mounts on to a boat seat or the gunwale of the boat; a positioning mechanism coupled to the base which allows the rod holder to rotate about an axis so that the rod can be angled in any direction from the boat; a tilting mechanism movably coupled to the base, so that the fishing rod can be angled along a vertical axis; a curved upper portion into which the handle of the fishing rod is inserted. The rod is then pushed against a clamping mechanism with elongated shoulders that rotate downward and hold the rod in place.

9 Claims, 5 Drawing Sheets

(56) References Cited

U.S. PATENT DOCUMENTS

| | | | | |
|---|---|---|---|---|
| 2011/0225870 A1* | 9/2011 | Carnevali | ............... | A01K 97/10 43/21.2 |
| 2012/0017487 A1* | 1/2012 | O'Keefe | ................ | A01K 97/10 43/21.2 |
| 2014/0047758 A1* | 2/2014 | Ciciulla | ................ | A01K 97/10 43/21.2 |
| 2015/0223440 A1* | 8/2015 | Schmaus | ................ | A01K 97/10 43/4.5 |
| 2016/0037762 A1* | 2/2016 | Thomas | ................ | A01K 97/10 248/636 |
| 2016/0255823 A1* | 9/2016 | Thomas | ................ | A01K 97/10 |
| 2018/0271078 A1* | 9/2018 | George | ................ | A01K 97/10 |

* cited by examiner

FLEXIBLE GRIP ROD HOLDER

CROSS-REFERENCE TO RELATED APPLICATION

This application claims the benefit of U.S. Provisional Application No. 62/319,841 filed on Apr. 8, 2016 the contents of which are herein incorporated by reference in its entirety.

FIELD OF THE INVENTION

The present disclosure relates generally to fishing rod holders and more particularly to a fishing rod holder that includes a quick-release mechanism when a fish is on the line of the rod.

BACKGROUND OF THE INVENTION

The statements in this section merely provide background information related to the present disclosure and may not constitute prior art, and therefore, nothing herein should be construed as an admission by the inventor or his legal representative that the information disclosed herein is prior art.

Fishing is one of the most popular sports in the world. It is also one where at least an equal number of creative methods are employed to catch that often-times elusive fish, for example, fishing by hand, by bow-and-arrow, by spear, use of dynamite, and nets. However, the most popular method is fishing from a boat with a rod and reel. As boat fishing allows for more area to be covered in a given time frame, it is understandable why so many anglers choose this method.

Recreational fishing is one of the largest industries in the world. According to "Economic Contributions of the U.S. Fishing Industry," Brookings, Sep. 3, 2014 article, it is estimated that that the fishing industry contributes nearly $90 billion annually to the economy and supported over one and half million jobs. U.S. anglers outnumber golfers nearly 2 to 1. In 2014, there were more than 40 million anglers. Just the anglers spent $41.8 billion on trips, equipment, licenses, and other items, an average of $1,262 per angler. According to the Boat Owners Association of the U.S., there are over 16,800,000 boats in use nationwide by 75 million users.

If there are multiple people fishing from a boat, there is an opportunity for the lines to tangle unless they are positioned correctly. Attempts have been made to solve this problem through the use of rod holders. However, conventional rod holders have various issues. For example, when the fish begins to take the bait, there is movement on the rod and the angler must remove the rod from the holder in order to jerk the line to set the hook in the fish's mouth. When the angler removes the rod from conventional rod holders, he has to disengage the clamping mechanism that causes vibration on the line, which can scare the fish off, thus making fish more difficult to catch.

Another deficiency found in many conventional rod holders is that the means for clamping and securing the rod is not sufficient to maintain the fishing rod in place and allow one to leave their rod in the holder during transit. Thus, if the decision is made to move to another fishing area, the anglers sometimes have to remove the fishing rods from the holders and stow their gear until the new destination is reached in order to protect their rods from damage caused by vibration during the move. If this is done, when the next fishing spot is reached the angler must reset the rods into the holders, and adjust them for the new location. This wastes valuable fishing time.

SUMMARY OF THE INVENTION

In an example embodiment, the present fishing rod holder includes a base that can be mounted, for example, on the gunwale of the boat or to a mounting plate for a seat of the boat. The base of the fishing rod holder can include a positioning mechanism that rotates about a vertical axis so that the rod can be angled in any direction from the boat, which can help prevent the tangling of lines when there are multiple fishermen. The positioning mechanism can also allow for the precise positioning of the rod when still fishing. The rod holder can also include a tilting mechanism disposed generally above the positioning mechanism. The tilting mechanism can allow the rod to be angled along a vertical axis, such as with the tip of the rod up in the air or down towards the water. The combination of the positioning mechanism and the tilting mechanism enables the angler to place the fishing rod in the exact position appropriate for the situation in which he is fishing.

The fishing rod holder can also include a rod holder disposed above the positioning mechanism and the tilting mechanism. The back of the fishing rod holder can include a curved upper portion into which the handle of the fishing rod is inserted. The rod holder can further include a clamping mechanism that includes an elongated shoulder. A fishing rod can be pushed against the clamping mechanism and the clamping mechanism can rotate downward to hold the fishing rod in place. This unique clamping mechanism allows the fisherman to grab the rod and set the hook in the fish's mouth without having to disengage a locking mechanism that can cause the line to vibrate, resulting in the fish dropping the bait before the angler can set the hook. The clamping mechanism can also include a locking mechanism to hold the fishing rod in place when the boat is moving from one spot to another so that the angler does not have to dismount the fishing rod and then set it up again when the next destination is reached.

BRIEF DESCRIPTION OF THE DRAWINGS

Accordingly, the present disclosure will be understood best through consideration of, and with reference to, the following drawing figures, viewed in conjunction with the Detailed Description of the Preferred and Selected Alternate Embodiments referring thereto, in which like reference numbers throughout the various figures designate like structure, and in which.

Figure 1:
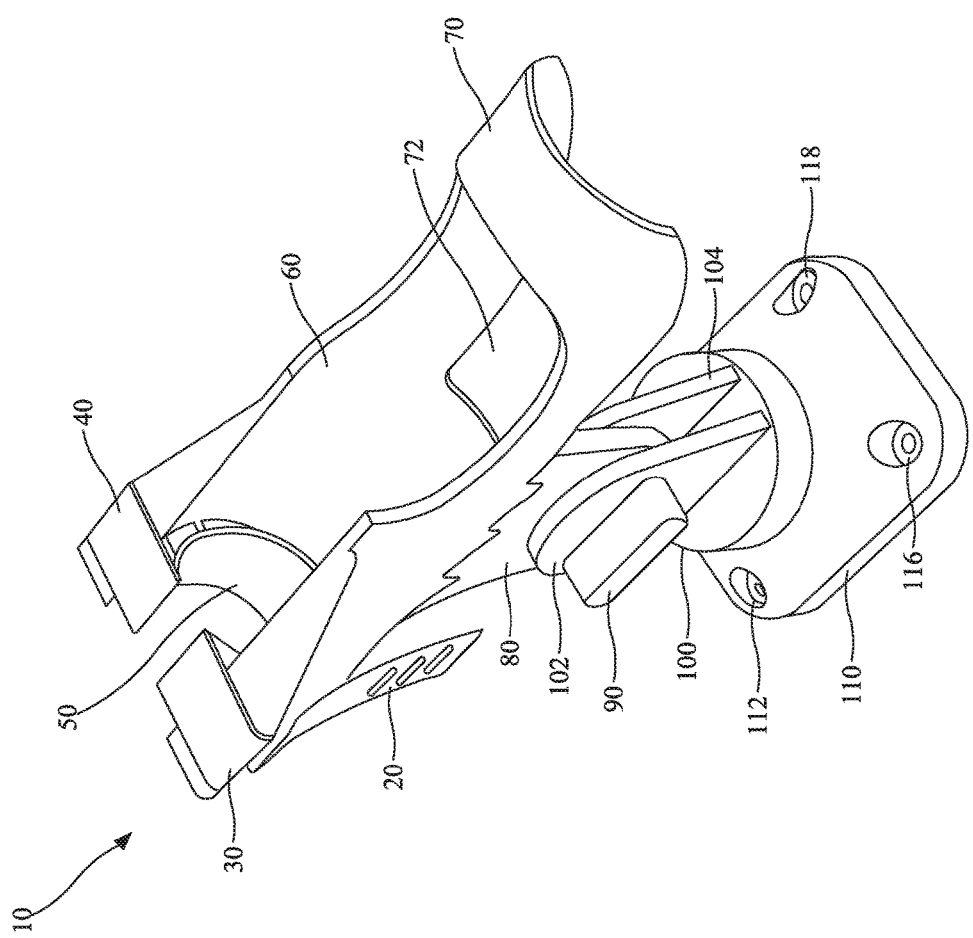
FIG. 1 is a rear perspective of the fishing rod holder assembly.

It is to be noted that the figures presented are intended solely for the purpose of illustration and that they are, therefore, neither desired nor intended to limit the invention to any or all of the exact details, steps, flow or order as shown, except insofar as they may be deemed essential to the claimed invention.

DETAILED DESCRIPTION

In describing the example embodiments of the present disclosure illustrated in FIGS. 1-5, specific terminology is employed for the sake of clarity. The claimed invention, however, is not intended to be limited to the example embodiments discussed or the specific terminology used herein, and it is to be understood that each specific element includes all technical equivalents that operate in a similar manner to accomplish a similar purpose. However, it should be noted that existing systems, processes, methods, and sub-elements thereof that operate in a similar manner to accomplish a similar purpose of an element or sub-element of the present invention shall not necessarily be considered prior art or necessarily be used to render any claim herein or claim having priority hereto as lacking novelty or as obvious.

The present disclosure relates to a flexible rod holder which may include a holder member, a mountable base member, a clamping assembly configured to secure the fishing rod within the holder member, and a locking mechanism. In one embodiment, the clamping assembly may include a flexible cam. The flexible cam may include a flexible strap member, a first cam and a second cam. The clamping assembly may also include a plurality of pins configured to secure the flexible cam to the rod holder body. For example, the flexible cam may contain a plurality of holes. Each of the plurality of holes may be slightly smaller than the diameter of each of the plurality of pins, such that, when each of the plurality of pins is inserted into the flexible cam they are held in place by the friction of the interface. The plurality of pins may be installed on the rod holder body such that the plurality of pins is configured to rotate within the rod holder body, but not able to rotate within the flexible cam. For example, the plurality of pins may be configured to rotate beyond a plurality of respective pivot points into a locked position in response to an application of pressure associated with an insertion of an end of a fishing rod into the rod holder body. When the plurality of pins is in a locked position, the flexible cam wraps around the fishing rod to secure the fishing rod in place. In order to hold the fishing rod in place as a boat moves from one spot to another the clamping assembly may include a locking mechanism such as, for example, a strap configured to rotate from an open position to a closed position such that when the locking strap is in the closed position the locking strap prevents the fishing rod from escaping the from the holder member. For example, the locking strap may be configured to secure the fishing rod within the holder member when the flexible cam is not wrapped around the fishing rod.

In one example embodiment, the fishing rod holder can be mounted to the gunwale of a boat, to a mounting plate for a seat of the boat, or any other place on a boat in order to free the angler's hands for other tasks than holding the fishing rod at all times. In one example embodiment, the fishing rod holder can include six sections: the mounting member; the holding member; the clamping assembly; the tilting mechanism; the positioning mechanism; and the locking strap. The mounting member is one portion of the rod holder that can be used to affix the rod holder to the dock, the boat, or a seat of the boat; the holding member is the portion of the rod holder in which the fishing rod handle rests when there is a fishing rod inserted into the rod holder; and the clamping assembly is the portion of the rod holder that can restrict the movement of the inserted fishing rod. The tilting mechanism can allow the angler to set the vertical positioning of the tip of the fishing rod up or down relative to the position of the water. The positioning mechanism, which can include interlocking shapes at prescribed locations, provides a rotational capability that allows the rod holder, and by association a fishing rod disposed therein, to rotate about an axis (e.g., a vertical axis when the mounting member is coupled along a horizontal surface or an axis orthogonal to or substantially orthogonal to the plane of the mounting surface that the mounting member is coupled to) so that the fishing rod can be moved to the right or left positioning the rod relative to the boat. The locking mechanism can be used to hold the fishing rod in place when the angler is not fishing. The exemplary mounting member can be attached to a surface in many ways. In one example embodiment, the mounting member includes one or more apertures (e.g., four apertures) for receiving a coupling device (such as a screw, bolt and nut, rivet, nail, clamp, etc.). The coupling device can be positioned through the aperture of the mounting member to couple the mounting member to the coupling surface. For example, a screw can be used as the coupling device and the mounting member can be screwed into the gunwale on the side of the boat. Alternatively, a bolt and nut can be used as the coupling device and the mounting member can be coupled to a mounting plate for a seat of the boat. In other alternative embodiments, the mounting member can also be affixed to other types of watercraft, a dock or any other structure so that the angler can be fishing without holding the rod.

In certain example embodiments, the inner surfaces of the holding member define a hollow semicircular tube or area in which the fishing rod rests while it is being held stationary within the rod holder. While this example holding member is described as semicircular, in alternate embodiments, the holding member can have an arcuate shape with a single or varying radius of curvature and can extend in a range from 20-300 degrees about a longitudinal axis for receiving the fishing rod. This holding member can be made of plastic, metal or any other substance that can withstand the force of a fish hitting the bait and beginning to run with it; since fishing poles come in various sizes the holding tube can potentially be manufactured in multiple diameters so that it can be purchased to fit any fishing pole.

The exemplary clamping assembly is configured to keep the fishing rod in place regardless of the force placed on it. The fishing rod easily snaps into the clamping assembly and will stay in the rod holder until the angler removes it. To this end, the fishing rod may resist downward forces and side forces once secured within the clamping assembly. Alternatively, when upward force is applied to the fishing rod, the fishing rod can be easily removed from the clamping assembly. Since this clamping mechanism does not require a lock to hold the fishing rod while it is in use it enables the angler to set the hook without having to first unlock another mechanism which can cause the fishing line to move and warn the fish causing the angler to lose that fish. In certain example embodiments, the body of the clamping mechanism can be made from multiple substances. For example, the elongated neck mechanism of the clamping mechanism can be made from a flexible rubber or plastic material that can be pivotally attached to a rod that is inserted through the body of the clamping mechanism. When pressure is applied to the center of the flexible neck mechanism it can rotate the triangular-shaped inverted shoulders until they pass their pivot point and snap into their downward locked position, which causes the neck to wrap around the fishing rod handle that has been placed in the rod holder and hold it in place. In one example embodiment, the flexible rod holder may also include a curved arch support positioned behind the flexible cam. The curved arch support may be configured to prevent the fishing rod from rotating upward once the fishing rod is inserted into the rod holder. In certain example embodiments, the tilting and positioning mechanisms can be used to position the rod in the exact position that the angler desires after the rod has been placed in the clamping mechanism. In another example embodiment, the locking mechanism can include a rubber strap that rotates on the pivot member that attaches the locking mechanism to the clamping mechanism. The exemplary locking mechanism can cover the top of the clamping mechanism and can be affixed to a button shaped piece on the distal side of the clamping mechanism.

In yet another exemplary embodiment, the fishing rod holder may include a cradle mechanism and a flexible jaw or flexible clamping mechanism. In this embodiment, a user may insert an object such as, for example, a fishing rod, a gun, and/or other object into the flexible jaw or flexible clamping mechanism. The flexible jaw or flexible clamping mechanism may then be forced downward into the cradle mechanism. As the flexible jaw or flexible clamping mechanism is pressed downward into the cradle mechanism, one or more compression members may provide an amount of compression that enables the flexible jaw or flexible clamping mechanism to close around the inserted object. In one exemplary embodiment, the one or more compression members may include a ratcheting strap that may be configured to lock the flexible jaw or flexible clamping mechanism within the cradle mechanisms at different elevations. In yet another exemplary embodiment, the flexible jaw or flexible clamping mechanism may be positioned upon an arch spring. Thereby, causing the inserted object to be secured within the flexible jaw or flexible clamping mechanism.

The flexible jaw or flexible clamping mechanism may be configured to be situated within the cradle mechanism. As a non-limiting example, the cradle mechanism may comprise a plurality of compression members that are configured to force the flexible jaw or flexible clamping mechanism into the closed position when situated or positioned within the cradle mechanism. Additionally, the flexible jaw or flexible clamping mechanism may also be configured to move upward out of the cradle mechanism. To this end, as the flexible jaw or clamping mechanism moves upward, the flexible jaw or flexible clamping mechanism opens wider and the amount of compression provided by the plurality of compression members is reduced and the object is able to be released or removed from the flexible jaw or flexible clamping mechanism. Now, referring to the drawings in which like numerals refer to similar, but not necessarily the same or identical, elements throughout.

FIG. 1 is a rear perspective view of the fishing rod holder assembly, in accordance with one example embodiment of the disclosure. Referring now to FIG. 1, the example rod holder includes a locking strap 20 that rotates from an open position to a closed position. In one example, the locking strap 20 rotates 180 degrees to cover portions of the clamping mechanism 30 and 40 in order to affix to holding button 22, which is not shown in this figure. In alternate embodiments, the locking strap can rotate more or less than 180 degrees, such as anywhere between 10-350 degrees. In one example embodiment, the clamping mechanisms 30 and 40 engage when the pressure of the insertion of the fishing rod is applied to the center of the flexible neck mechanism. Application of this pressure cause a corresponding rotation of the triangular shaped inverted shoulders 30 and 40 until they pass their pivot point and snap into their downward locked position, which causes the neck to wrap around the handle of the fishing rod, which has been placed in the rod holder and holds it in place against the piece 50. In certain example embodiments, the piece 50 is made of rubber, however, in alternative embodiments; the piece 50 can be made of plastic, metal, or any other known material. When inserted, the handle of the fishing rod lies atop the curved bottom 60 of the holding mechanism and goes under the elevated curved piece 70. While the bottom 60 and piece 70 have been described as being curved or curved in this example embodiment, in alternate embodiments, the bottom 60 and piece 70 can have any other shape, including a flat surface or a curved shape that matches or substantially radius of curvature or curved shape of the handle of the fishing rod. By providing a holding surface on opposing or substantially opposing sides of a handle of a fishing rod, the bottom 60 and piece 70 can hold the handle of the fishing rod securely in place no matter where pressure is applied to the fishing rod. In certain example embodiments, the curved holding piece 60 can also include a rectangular cutout 72 to allow for water to drain out of the apparatus. While the example cutout is described as having a rectangular shape, other shapes including, but not limited to, curved or any other geometrical or non-geometrical shape could be substituted for the rectangular shape of the cutout. As long as the lock 20 is not in place, the angler can grasp the fishing rod above the clamping mechanism 30, 40, and 50 and pull upward, which both sets the hook in the fish's mouth and frees the rod so that the angler can fight the fish.

In one example, the holding mechanism is mounted on 80 which can rotate the tilt of the rod holder by loosening the pivot point by turning knob 90 and setting the rod holder to the desired tilt or vertical position. This tilting mechanism can be mounted to piece 100 which can include a rotating circular bottom and two mounting sides 102 and 104 into which the tilting mechanism is inserted. In one example embodiment, the circular bottom piece is a positioning mechanism that rotates, for example, 360 degrees, about an axis. In one example, the axis of rotation of the positioning mechanism is orthogonal to or substantially orthogonal to the mounting plane of the mounting surface for the rod holder so that the rod holder can be placed at an angle to the gunwale that the angler prefers. The example bottom mounting member 110 can include one or more screw holes or apertures 112, 114 (e.g., four apertures), which is not shown in this perspective and 116 and 118. Each aperture is configured to receive a coupling device, such as a nail, screw, bolt (used with nut), rivet, clamp, etc.), to hold the mounting member to a mounting surface. In one example, screws are inserted into these apertures 112, 114, 116, and 118 and screwed into the gunwale, or any other portion, of the boat to secure the entire rod holder in place. In an alternative embodiment, one or more bolts and nuts can be used as the coupling device and the mounting member can be coupled to a mounting plate for a seat of the boat.

Figure 2:
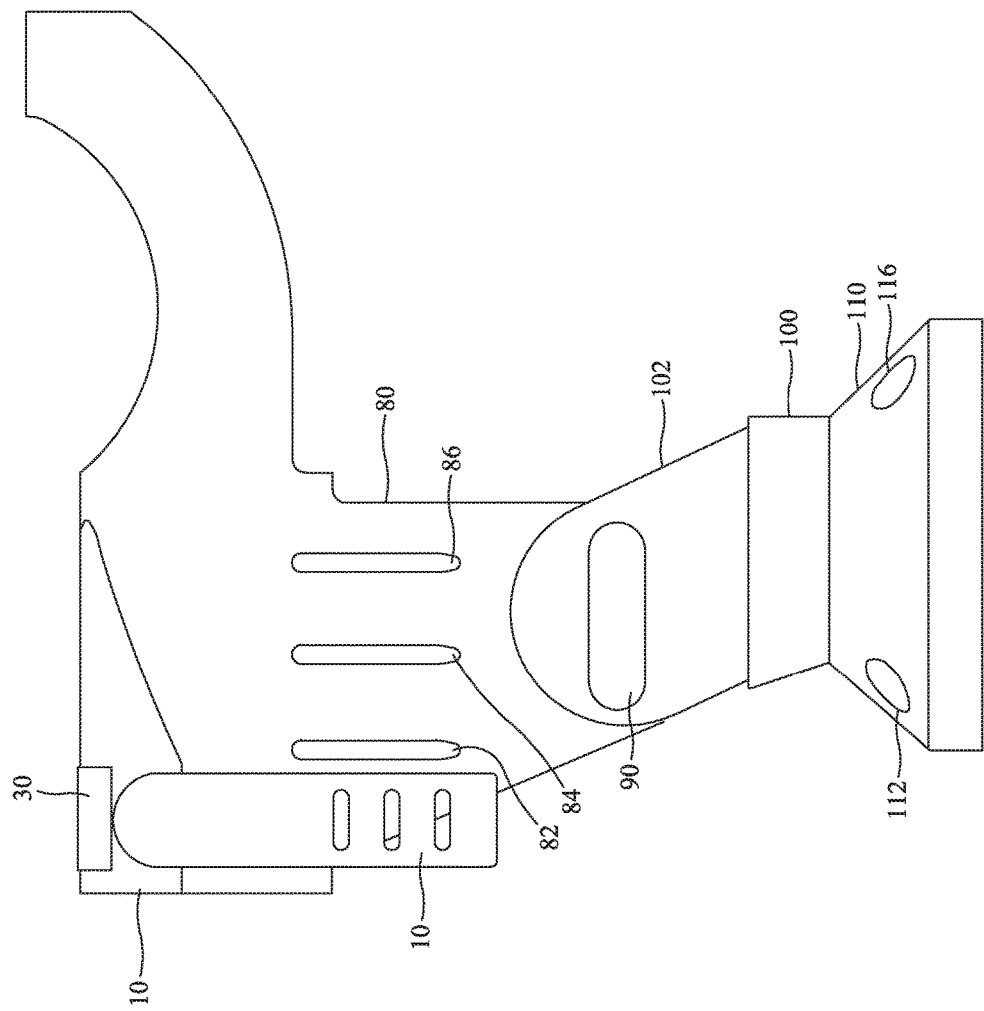
FIG. 2 is side view of the fishing rod holder assembly.

FIG. 2 is a side view of the fishing rod holder assembly, in accordance with one example embodiment of the disclosure. Now referring to FIG. 2, in one example, embodiment, the locking strap 20 rotates, for example, 180 degrees and covers the proximate side of the clamping mechanism 30 and affixes to a button on the distal side of the clamping mechanism. In certain example embodiments, the rod holder 70 is attached to the holding mechanism 80 which has three fins 82, 84 and 86 which provide stability and support. There are also three fins on the distal side which do not appear in any of the illustrations. While the example embodiment presents three fins on proximal and distal sides of the holding mechanism, in alternate embodiments fewer or greater number of fins (e.g., from 0-20 fins) may be used and the number of fins on the distal side may not be the same as the number of fins on the proximal side. FIG. 2 shows the proximal side 102 of the tilting mechanism. The tilting mechanism can include an adjustable knob 90 that can be rotated or otherwise adjusted to loosen the pivot point for the holding portion of the tilting mechanism 80 so that the rod holder can be moved at the desired angle. The knob 90 may then be rotated or otherwise adjusted back to position to tighten the internal pivot point so that the rod holder stays in place. In an alternate embodiment, rather than rotating the knob 90, the knob can be replaced with a locking mechanism that can be engaged/disengaged to permit adjustment of the tilting mechanism 80 and thereby the vertical positioning of the fishing rod disposed within the rod holder. In certain example embodiments, tilting mechanism 80 is affixed to a positioning knob 100, which, when adjusted, permits the tilting mechanism 80 to turn 180 degrees so that the fishing rod can placed in the vertical position that the angler prefers. This positioning mechanism is attached to the mounting assembly 110 with, for example, screws or other coupling devices inserted into the holes 112 and 116.

Figure 3:
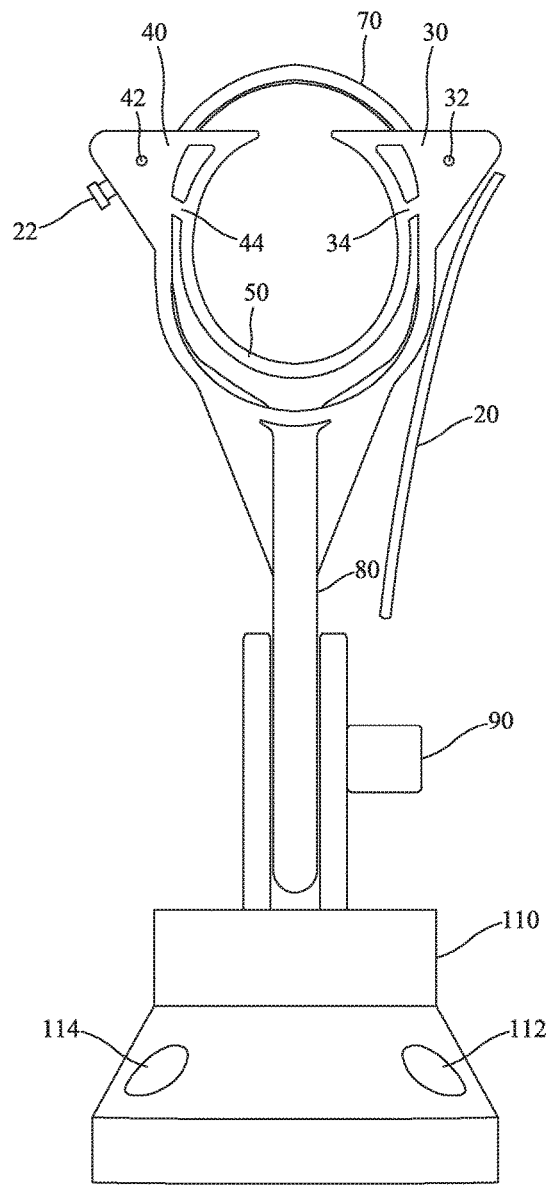
FIG. 3 is a front view of the fishing rod holder assembly.

FIG. 3 is a front view of the fishing rod holder assembly, in accordance with one example embodiment of the disclosure. Now referring to FIG. 3, the rod holder further includes clamping mechanism shoulders 30, 34, 40, and 44 that rotate on pins 32 and 42 when the fishing rod is inserted into the rod holder. In one example embodiment, the clamping mechanism shoulders 30, 34, 40, and 44 can each have a triangular shape and can be made or rubber. Alternatively, the clamping mechanism shoulders 30, 34, 40, and 44, can have any other curved, circulate, geometric, or non-geometric shape and can be made from plastic, metal, or any other material known to those of ordinary skill in the art. When the pressure of the insertion of the handle of the fishing rod is applied, these triangular shaped pieces pass their pivot point and snap downward holding the handle of the fishing rod firmly against the bottom 50 of the clamping mechanism. The handle of the fishing rod passes under the curved part of piece 70 and rests on the bottom 50 of the clamping mechanism and 60 the bottom piece of the holding mechanism. The fishing rod can be locked in place by rotating the locking strap 20, for example, 180 degrees and attaching the locking strap 20 to the knob or button 22. This clamping mechanism is affixed to the tilting mechanism 80 which can be adjusted through the use of the knob 90. For example, when the knob 90 is loosened, the rod holder tilts to the desired angle and tilting mechanism 80 is held in place by tightening the knob 90. In certain example embodiments, the tilting mechanism 80 is disposed atop or adjacent to the positioning mechanism 110, which rotates so that the fishing rod can be positioned facing the desired direction. In one example embodiment, the positioning mechanism rotates about a first axis and the tilting mechanism 80 rotates about a second axis that is orthogonal or substantially orthogonal to the first axis. Further, the positioning mechanism can be affixed and/or disposed adjacent to the mounting assembly 110, which is held in place by screws or other coupling devices 112 and 114.

Figure 4:
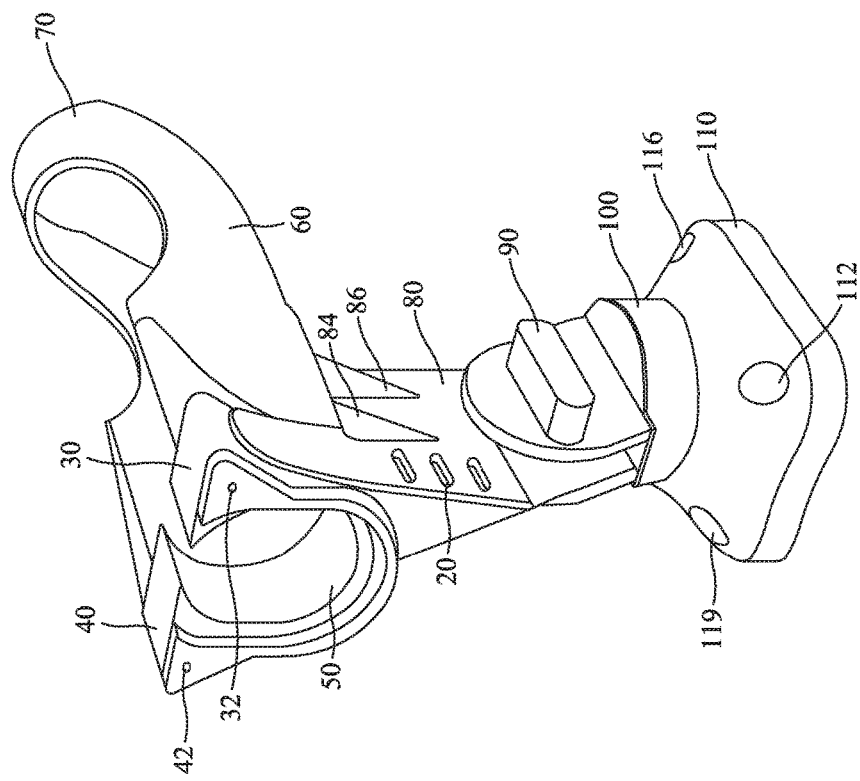
FIG. 4 is a front perspective of the fishing rod holder assembly.

FIG. 4 is a front perspective view of the fishing rod holder assembly, in accordance with one example embodiment of the disclosure. Now referring to FIG. 4, the locking strap 20 rotates, for example, 180 degrees, and can cover the clamping mechanisms 30 and 40. The locking strap 20 can be affixed to our couple to a button on the distal side of the fishing rod holder. The clamping mechanism shoulders 30 and 40 can rotate on pins 32 and 42 until they pass their pivot point and clamp shut in the downward position holding the handle of the fishing rod in place against the rubber bottom 50 of the clamping mechanism. The fishing rod is positioned through the curved opening 70 of the body of the fishing rod holder and then lays on the rubber bottom 50 of the clamping mechanism 80 and the bottom of the holding mechanism 60. In certain example embodiments, the holding mechanism 60 is affixed or otherwise movably coupled to the tilting mechanism 80 and can include fins 84 and 86 for strength and stability. In certain example embodiments, the tilting mechanism 80 can include an adjustment knob 90 which rotates or is otherwise adjusted to loosen its grip on the tilting mechanism 80 so that the tilting mechanism can be adjusted to vertically position the opposing end (e.g., the tip) of the fishing rod at any angle/height desired by the angler. When the fishing rod holder is at the preferred angle, knob 90 is rotated or otherwise adjusted to tighten or hold the tilting mechanism 80 in the new position so that the fishing rod maintains the correct angle. In one example embodiment, the tilting mechanism 80 is mounted on 110, which is the piece through which the fishing rod holder is attached to the gunwale, the seat or another portion of the boat, a dock, or another place for fishing by inserting screws or other coupling devices into the apertures 112, 116, and 118.

Figure 5:
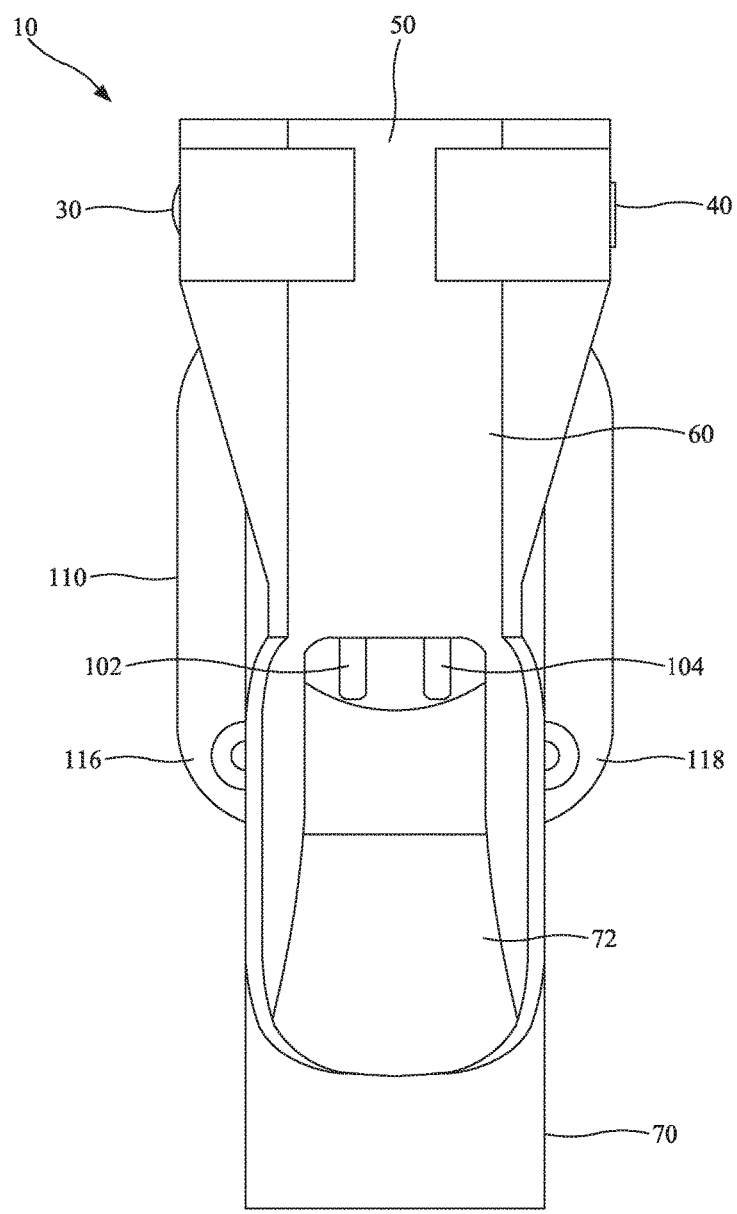
FIG. 5 is a top view of the fishing rod holder assembly.

FIG. 5 is a top view of the fishing rod holder assembly, in accordance with one example embodiment of the disclosure. Now referring to FIG. 5, the shoulders 30 and 40 of the clamping mechanism 80 rotate downward when the fishing rod is inserted until the shoulders 30 and 40 pass their pivot point and clamp downward holding the fishing rod against the rubber bottom 50 of the clamping mechanism 80. The handle of the fishing rod is positioned through the upward curve 70 of the fishing rod holder and lays on the curved rubber bottom 50 of the clamping mechanism 80 and the bottom 60 of the holder mechanism of the rod holder apparatus. Water can drain through the hole or opening 72 built into the body of the holder mechanism. In certain example embodiments, the holder mechanism is attached to two sides 102 and 104 of the tilting mechanism 80 of the rod holder. The tilting mechanism 80 can further be attached and/or movably coupled to the mounting portion 100 which is attached to the gunwale of the boat, a dock, a mounting area of a boat seat or another area desired by an angler by putting screws or other coupling devices through the apertures 116 and 118.

Accordingly, while a preferred embodiment of the present disclosure is described herein, it is appreciated that modifications are possible that are within the scope of the present disclosure. One should note that conditional language, such as, among others, "can," "could," "might," or "may," unless specifically stated otherwise, or otherwise understood within the context as used, is generally intended to convey that certain embodiments include, while other embodiments do not include certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations merely set forth for a clear understanding of the principles of the present disclosure. Many variations and modifications may be made to the above described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure. One skilled in the art with the benefit of this disclosure would appreciate that a multitude of variations and modifications are possible and would be within the scope of the present invention.

What is claimed:

1. A flexible rod holder comprising:
   a mountable base member;
   a clamping assembly configured to secure the fishing rod within a curved holder member, wherein the curved holder member is configured to receive an end of a rod, wherein the curved holder member is positioned behind a flexible cam, wherein the clamping assembly comprises:
   the flexible cam including a flexible strap member, a first cam and a second cam; and
   a plurality of pins, the plurality of pins being configured to secure the flexible cam to a rod holder body.

2. The flexible rod holder of claim 1 further comprising a locking mechanism configured to be movably coupled to the rod holder body.

3. The flexible rod holder of claim 2, wherein the locking mechanism comprises a strap configured to extend over at least a portion of the clamping assembly.

4. The flexible rod holder of claim 2, wherein the locking mechanism being configured to rotate from an open position to a closed position.

5. The flexible rod holder of claim 2, wherein the locking mechanism being configured to rotate from 10 to 350 degrees, inclusive.

6. The flexible rod holder of claim 3, wherein the strap being configured to affix to a button positioned on a distal side of the clamping mechanism.

7. The flexible rod holder of claim 1, wherein the flexible cam being connected to the plurality of pins.

8. The flexible rod holder of claim 7, wherein the plurality of pins being configured to rotate beyond a plurality of respective pivot points into a locked position in response to an application of pressure associated with an insertion of an end of a fishing rod into the rod holder body.

9. The flexible rod holder of claim 6, wherein the flexible cam being configured to wrap around the handle of the fishing rod.

* * * * *